March 10, 1936.    H. WÖRNER    2,033,664
OVERFLOW VALVE FOR HYDRAULIC SHOCK ABSORBERS
Filed July 7, 1932
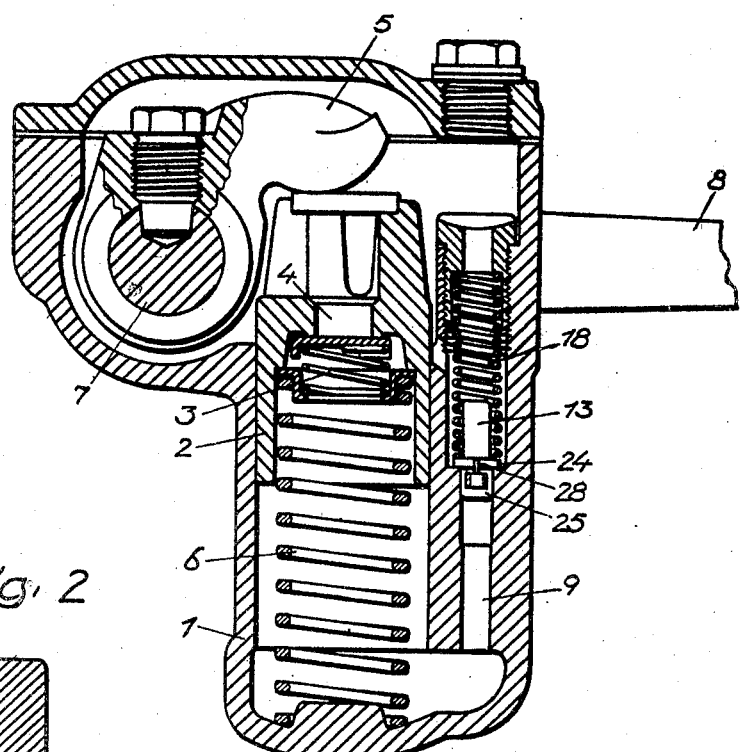
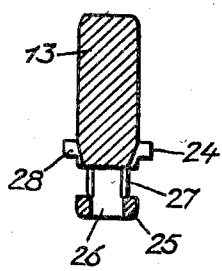
H. Wörner
INVENTOR
By: Marks & Clark
Attys.

March 10, 1936.  H. WÖRNER  2,033,664
OVERFLOW VALVE FOR HYDRAULIC SHOCK ABSORBERS
Filed July 7, 1932
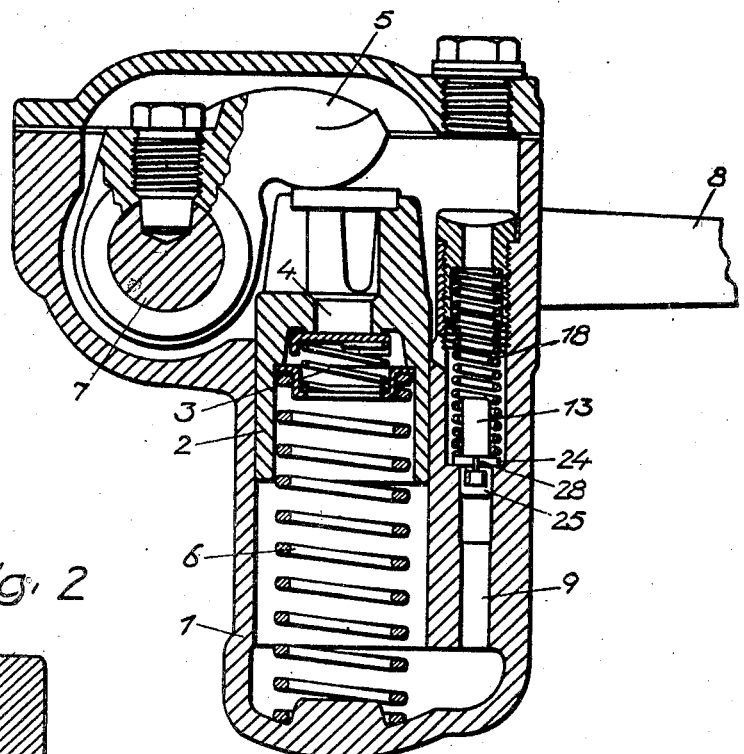
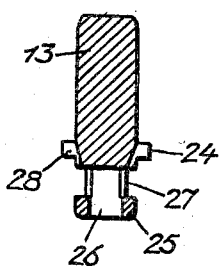
H. Wörner
INVENTOR
By: Marks & Clark
Attys.

Patented Mar. 10, 1936

2,033,664

UNITED STATES PATENT OFFICE 2,033,664

OVERFLOW VALVE FOR HYDRAULIC SHOCK ABSORBERS

Heinrich Wörner, Bischofsheim, Germany, assignor to Fichtel & Sachs Aktiengesellschaft, Schweinfurt-on-the-Main, Germany Application July 7, 1932, Serial No. 621,322
In Germany July 13, 1931

1 Claim. (Cl. 251—120)

The present invention relates to valve mechanism for hydraulic shock absorbers for power-driven vehicles. It is known to use valves with narrow conical stems in order to obtain an automatic regulation of the velocity of flow of the damping liquid within certain limits by the overflow cross section being increased as the stroke increases. Such a property of the shock absorber is of advantage because sudden severe shocks at the axles of the vehicle cannot have a bad effect on the mechanical construction of the shock absorber; and, further, the different effects of the viscosity of the damping liquid in summer and winter are compensated for. Experiments have shown that even small variations in the cross section of the flow of the valve for damping liquid are sufficient for obtaining the desired automatic regulation. The present invention relates to a valve construction in which, while economical manufacture is considered, the intended action is obtained with certainty, and, at the same time, the shock absorber is simplified.

The accompanying drawing illustrates the invention by means of longitudinal sections in vertical planes of symmetry. Fig. 1 shows the general construction of the shock absorber, and Fig. 2 the valve member of the overflow valve on a larger scale.

In the cylindrical boring 1 of the shock absorber casing the piston 2, which is acted on by the pressure of a spring 6 and which has an opening 4 usually closed by the spring valve 3, is slidable in a known manner. The piston 2 is driven by means of the lever 5 arranged in the shock absorber casing, the axle 7 of which, leading to the outside, has mounted on it the operating lever 8 which is connected outside with the axle of the vehicle. Beside the cylindrical boring and parallel to it is arranged in known manner the overflow channel 9, which, as a rule, is closed by the valve 13 acted on by the compression spring 18. The valve body 13 consists essentially of the flange 24 resting on the valve seating, and the stem 25 offset with respect to the flange and reaching into the overflow channel 9.

The invention lies in the particular construction of the valve stem 25. This is provided with an axial boring 26 which leads into two lateral outlets 27. The flange 24 and a part of the stem 25 are provided with two or more grooves 28, the base surfaces of which run downwards obliquely.

The mode of operation of the shock absorber, as far as the known parts are concerned, is that when the springs of the vehicle are compressed the operating lever 8 is forced upwards so that the piston 2 under the action of the helical spring 6 is raised in the cylinder 1, and the damping liquid filling the hollow space of the shock absorber casing, as far as it is above the piston 2, after pressing down the valve 3, passes in a known manner through the opening 4 to below the piston 2. This movement is of course not damped or not damped to any appreciable extent. At the subsequent return movement of the vehicle spring, the operating lever 8 and with it the piston 2 are moved downwards, the valve 3 remaining closed. Consequently the liquid below the piston 2 raises the valve 13 against the pressure of the spring 18 and liquid flows through the channel 9 and past the valve 13 into the space in the casing above the piston 2. The overflow movement of the liquid is checked by the restricted cross section at the raised valve 13 and consequently there is the desired damping of the oscillation of the springs of the vehicle.

This mode of operation is improved by the present invention in that sudden and severe shocks lift the valve 13 higher than slight and slow shocks. The higher the valve flange 24 is raised the greater are the groove cross sections 28 coming into operation; also the passage of the liquid is facilitated and consequently the desired compensation between shocks of different intensity is secured. The same conditions apply when the viscosity of the liquid varies according to the season. Further, with very severe shocks, which in time might produce a detrimental effect on the separate parts of the shock absorber, the valve member 13 is lifted so high that the lateral openings 27 come above the valve seating and thereby make the passage of liquid much easier.

What I claim is:

An overflow valve for hydraulic shock absorbers, having a valve seating and an overflow channel, a valve stem adapted to extend into the overflow channel below the seating, a flange on the lower part of the stem to engage the seating, said stem having in its lower end an axial bore open to the overflow channel and with the wall of the stem provided with lateral outlets leading from the axial bore, and said stem and flange having grooves extending through the same to provide restricted communications from the lateral outlets of the axial bore to the overflow channel above the valve flange engaging the seating.

HEINRICH WÖRNER.